(12) United States Patent
McDaniel et al.

(10) Patent No.: US 10,703,954 B2
(45) Date of Patent: Jul. 7, 2020

(54) PETRIFIED CELLULOSIC MATERIALS AS ADDITIVES TO TREATMENT FLUIDS

(71) Applicant: HALLIBURTON ENERGY SERVICES, INC., Houston, TX (US)

(72) Inventors: Cato Russell McDaniel, The Woodlands, TX (US); Dale E. Jamison, Humble, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 16/520,889

(22) Filed: Jul. 24, 2019

(65) Prior Publication Data

US 2019/0345371 A1 Nov. 14, 2019

Related U.S. Application Data

(62) Division of application No. 15/774,083, filed as application No. PCT/US2016/012479 on Jan. 7, 2016, now abandoned.

(51) Int. Cl.
*C09K 8/035* (2006.01)
*C09K 8/80* (2006.01)
*C09K 8/90* (2006.01)
*C09K 8/48* (2006.01)
*C09K 8/487* (2006.01)
*C09K 8/70* (2006.01)
*E21B 43/267* (2006.01)
(Continued)

(52) U.S. Cl.
CPC .............. *C09K 8/035* (2013.01); *C04B 18/28* (2013.01); *C04B 20/1077* (2013.01); *C04B 28/02* (2013.01); *C09K 8/10* (2013.01); *C09K 8/42* (2013.01); *C09K 8/48* (2013.01); *C09K 8/487* (2013.01); *C09K 8/506* (2013.01); *C09K 8/70* (2013.01); *C09K 8/80* (2013.01); *C09K 8/90* (2013.01); *E21B 43/267* (2013.01); *C04B 2103/46* (2013.01); *C09K 2208/08* (2013.01); *Y02W 30/97* (2015.05)

(58) Field of Classification Search
None
See application file for complete search history.

(56) References Cited

U.S. PATENT DOCUMENTS 2,850,098 A 9/1958 Moll et al.
4,612,050 A 9/1986 Hicks
(Continued)

FOREIGN PATENT DOCUMENTS

WO WO2001066600 A1 9/2001

OTHER PUBLICATIONS

DOE/PACIFIC Northwest National Laboratory, "Want to petrify wood without waiting a few million years? Try this," Jan. 24, 2005, EurekaAlert! The Global Source for Science News, retrieved May 3, 2018. https://www.eurekalert.org/pub_releases/2005-01/dnnl-wtp012405.php.

(Continued)

*Primary Examiner* — Andrew Sue-Ako
(74) *Attorney, Agent, or Firm* — Haynes and Boone, LLP

(57) ABSTRACT

Methods for treating a subterranean formation are described. The methods include providing a petrified cellulosic material, combining the petrified cellulosic material with a treatment fluid, and introducing the treatment fluid with the petrified cellulosic material in the subterranean formation.

11 Claims, 2 Drawing Sheets

(51) Int. Cl.
  *C04B 28/02* (2006.01)
  *C04B 20/10* (2006.01)
  *C04B 18/28* (2006.01)
  *C09K 8/10* (2006.01)
  *C09K 8/42* (2006.01)
  *C09K 8/506* (2006.01)
  *C04B 103/46* (2006.01)

(56) References Cited

U.S. PATENT DOCUMENTS

| | | |
|---|---|---|
| 8,883,300 B1 | 11/2014 | Miller et al. |
| 2004/0105938 A1 | 6/2004 | Stein |
| 2006/0079408 A1 | 4/2006 | Verret |
| 2007/0272596 A1 | 11/2007 | Erasmus et al. |
| 2010/0239679 A1* | 9/2010 | Greene .................. A01N 25/26 |
| | | 424/490 |
| 2012/0245059 A1 | 9/2012 | McDonald |
| 2013/0233545 A1 | 9/2013 | Mahoney et al. |
| 2013/0274149 A1 | 10/2013 | Lafitte et al. |
| 2014/0121134 A1* | 5/2014 | Kuri .......................... C09K 8/57 |
| | | 507/112 |

OTHER PUBLICATIONS

Hiscox, G.D., "Henley's Twentieth Century Formulas, Recipes and Processes: Containing Ten Thousand Selected Household, Workshop and Scientific Formulas, Trade Secrets, Chemical Recipes, Processes and Money Saving Ideas; a Valuable Reference Book for the Home, the Factory, the Office and the Workshop, 1916, p. 606, N.W. Henley Publishing C°.".

International Search Report and Written Opinion for International Application No. PCT /US2016/012479 dated Aug. 29, 2016. (8 pages).

* cited by examiner

PETRIFIED CELLULOSIC MATERIALS AS ADDITIVES TO TREATMENT FLUIDS

CROSS-REFERENCE TO RELATED APPLICATIONS

This application is a divisional of U.S. application Ser. No. 15/774,083 filed May 7, 2018, which is a national stage application of International Application No. PCT/US2016/012479, filed Jan. 7, 2016, the entire contents of each of which are incorporated herein by express reference thereto.

BACKGROUND

The present invention relates generally to petrified cellulosic materials, and more particularly to petrified cellulosic materials that are added to wellbore treatment fluids.

In the exploration for oil and gas, wellbore treatment fluids (e.g., drilling fluids and cement slurries) are used. In well drilling, a drilling fluid servicing fluid, or mud is pumped down through the drill stem of the rotary rig, circulated around the drill bit and returned to the surface through the annular passage between the drill stem and the well wall. The drilling fluid lubricates the drill stem and bit, cools the bit and carries the cuttings from the bit up to the surface. The drilling fluid also provides a hydrostatic head against the walls of the well to contain downhole geopressure.

One of the main functions of cement compositions is to maintain the well integrity during the well's lifetime, which can be more than 30 years. The cement reduces the risk of uncontrolled flow of oil or gas (e.g., provides permeable-zones isolation), provides mechanical support for the casing string, protects casing from corrosion, and supports the wellbore walls to prevent collapse of formations. Cements are further used to make permanent or temporary seals (plugs).

Typical wellbore treatment fluids (e.g., drilling fluids, completion fluids, fracturing fluids, and cements) contain a number of additives, each satisfying a specific purpose. For example, additives are used to control the rheology of the wellbore treatment fluid, to improve its filtration properties and/or increase its density. Notwithstanding the cost associated with such additives, the overall cost of the drilling operation is decreased by the improvement made by these additives on the drilling rate and hole-cleaning processes.

Typical additives include proppants, weighting agents, fluid loss control agents, and gravel pack materials. These additives are generally round or spherical in shape, and are formed from materials such as glass or ceramics. Other morphologies or shapes, however, may be more suited for the different purposes of the additives. To manufacture additives in these desired shapes requires high energy and high temperatures, which results in a very expensive process.

Thus, there is a continuing need for improved methods and compositions for additives in wellbore treatment fluids.

BRIEF DESCRIPTION OF THE DRAWINGS

The following figures are included to illustrate certain aspects of the present invention, and should not be viewed as an exclusive embodiment. The subject matter disclosed is capable of considerable modification, alteration, and equivalents in form and function, as will occur to those skilled in the art and having the benefit of this disclosure.

DETAILED DESCRIPTION

Figure 1:
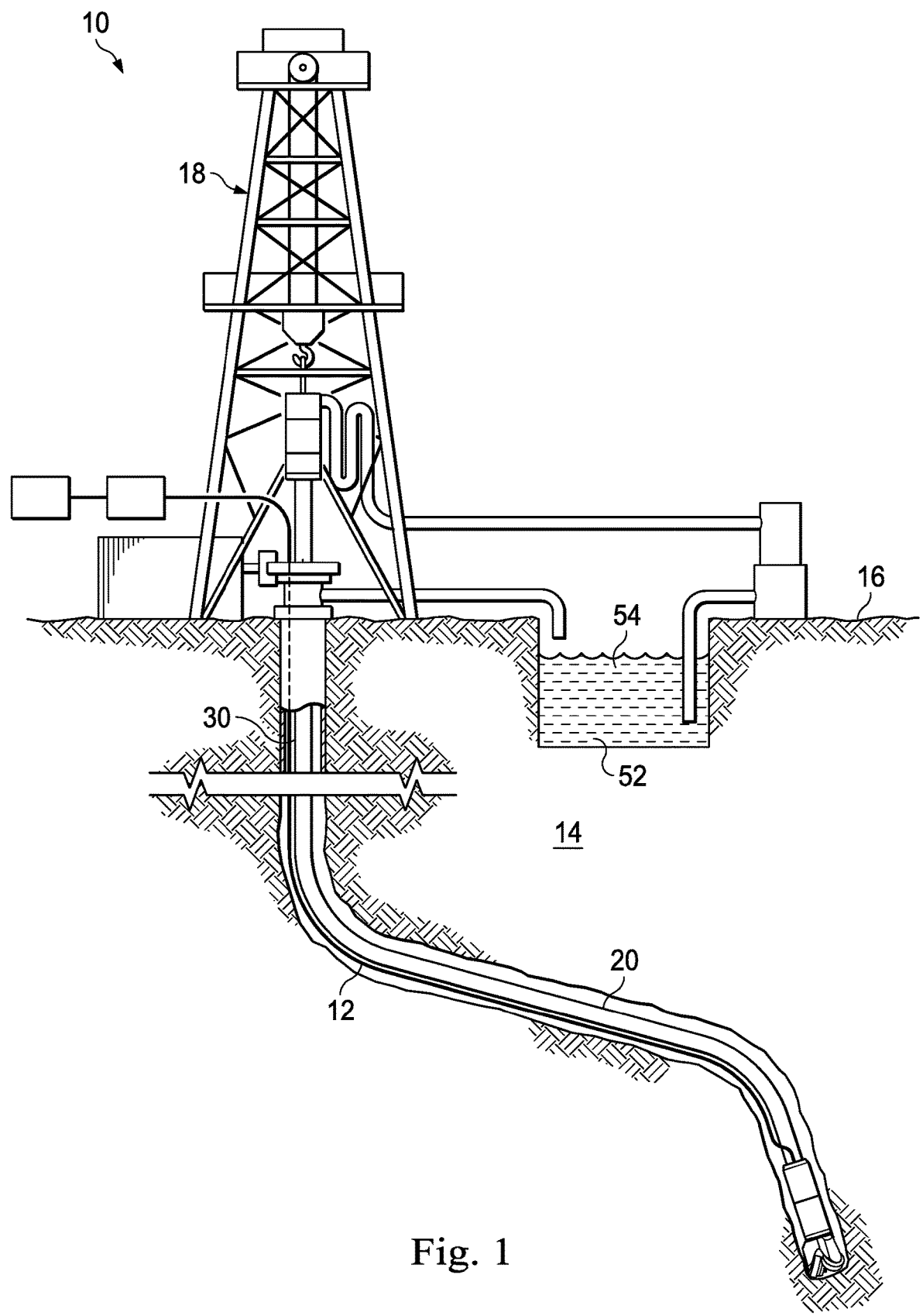
FIG. 1 illustrates a land-based drilling and production system.

According to several exemplary embodiments, methods are provided for treating subterranean formations using petrified cellulosic materials. Such treatment operations can include, for example, drilling operations, cementing operations, stimulation operations, production operations, remediation operations, sand control treatments, and the like. As used herein, the terms "treat," "treatment," and "treating" refer to any subterranean operation that uses a fluid in conjunction with achieving a desired function and/or for a desired purpose. More specific examples of treatment operations include drilling operations, fracturing operations, gravel packing operations, cementing operations, sand control operations, consolidation operations, completion operations, and the like.

According to several exemplary embodiments, methods of manufacturing additives for treatment fluids and methods of using the additives are described. According to several exemplary embodiments, the additives may be used in a variety of treatment fluids, for example, both oil-based and water-based drilling fluids, and any type of cement. Advantageously, the additives have a controlled morphology and can be made from various cellulosic materials.

According to several exemplary embodiments, a method of treating a subterranean formation is provided. The method includes providing a petrified cellulosic material, combining the petrified cellulosic material with a treatment fluid, and introducing the treatment fluid with the petrified cellulosic material in the subterranean formation. The petrified cellulosic material may be formed from any cellulose-based material, such as wood, paper, bamboo, cotton, grass, and straw materials. The cellulose material in the petrified cellulosic material is generally replaced with a siliceous material. The petrified cellulosic material may be in any shape, including, but not limited to, a sheet, fiber, tube, rod, disc, and ring. Suitable treatment fluids that may be combined with the petrified cellulosic material include drilling fluids, completion fluids, fracturing fluids, and cement. The petrified cellulosic material can act as a proppant, weighting agent, fluid loss control agent, and/or gravel pack material.

According to several exemplary embodiments, another method of treating a subterranean formation is provided. The method includes providing a cellulosic material, providing a treatment fluid comprising a siliceous material, combining the cellulosic material with the treatment fluid, introducing the cellulosic material and the treatment fluid in the subterranean formation, and allowing the cellulosic material to contact the siliceous material to form a petrified cellulosic material. The cellulosic material may be one or more of wood, paper, bamboo, cotton, grass, and straw materials. The cellulosic material may be in the shape of a sheet, fiber, tube, rod, disc, and/or ring. Suitable treatment fluids that may be combined with the cellulosic material are drilling fluids, cement, completion fluids, and fracturing fluids. In particular, the drilling fluid may include a silicate based drilling mud, such as a sodium silicate or potassium silicate based drilling mud. The petrified cellulosic material can act as a weighting agent, fluid loss control agent, and/or wellbore strengthening pill material in the silicate based drilling mud.

According to several exemplary embodiments, a treatment fluid that is introduced into a subterranean formation is provided. The treatment fluid includes an aqueous carrier fluid and at least one proppant, weighting agent, fluid loss control agent, or gravel pack material in the form of a petrified cellulosic material. The petrified cellulosic material may be formed from wood, paper, bamboo, cotton, grass, and/or straw materials. The petrified cellulose material may be in the shape of a sheet, fiber, tube, rod, disc, and/or ring. The cellulose material in the petrified cellulose material is typically replaced with a siliceous material. The treatment fluid may further include a cementitious particulate.

Turning to FIG. 1, shown is an elevation view in partial cross-section of a wellbore drilling and production system 10 utilized to produce hydrocarbons from wellbore 12 extending through various earth strata in an oil and gas formation 14 located below the earth's surface 16. Drilling and production system 10 may include a drilling rig or derrick 18 to perform various activities related to drilling or production, such as the methods described below. Likewise, drilling and production system may include various types of tools or equipment 20 supported by rig 18 and disposed in wellbore 12 for performing these activities.

A working or service fluid source 52, such as a storage tank or vessel, may supply a working fluid 54 pumped to the upper end of tubing string 30 and flow through tubing string 30. Working fluid source 52 may supply any fluid utilized in wellbore operations, including without limitation, drilling fluid, cementitious slurry, acidizing fluid, liquid water, steam, hydraulic fracturing fluid, propane, nitrogen, carbon dioxide or some other type of fluid.

Cellulosic resources are in general very widespread and abundant. For example, forests comprise about 80% of the world's biomass. Being abundant and outside the human food chain makes cellulosic materials relatively inexpensive starting materials.

Cellulosic materials are made of lignin, hemicellulose, and cellulose, and are thus sometimes called lignocellulosic materials. Cellulose molecules consist of long chains of glucose molecules as do starch molecules, but have a different structural configuration. These structural characteristics plus the encapsulation by lignin makes cellulosic materials more difficult to hydrolyze than starchy materials.

According to several exemplary embodiments, the cellulosic materials used to make the additives include materials such as wood (e.g., wood chips), paper, bamboo, cardboard, green algae, cotton, grasses, cornstalks, straw, and other fibrous plant materials. The cellulosic materials can be fabricated into a variety of different shapes including sheets, fibers, tubes, rods, discs, rings, polyhedrals, ellipsoids, cones, and combinations thereof. Almost any shape can be constructed from wood or paper.

According to several exemplary embodiments, the carbonaceous matter in the cellulosic materials is replaced with siliceous material, which has significantly higher density and strength, yet retains the shape of the cellulosic material. The resulting material is harder and stronger, and allows for the formation of additives with specific desired shapes that are not obtainable with glass or ceramic materials. According to several exemplary embodiments, the cellulosic material is provided in the desired shape before treatment with the siliceous material.

According to several exemplary embodiments, the additives are formed using petrification. It has been reported that various silicate mixtures can be used to rapidly petrify organic material, especially wood, in a short amount of time to produce materials that are similar, if not identical, to petrified materials. For example, U.S. Pat. No. 4,612,050 to Hicks describes the use of a mineralized sodium silicate composition on wood to give the wood characteristics of petrified wood. Henley's Twentieth Century Formulas, Recipes, and Processes (1916 Edition) describes a method of petrifying wooden objects by mixing gem-salt, rock-alum, white vinegar, chalk and powdered pebbles, and soaking wooden objects in this solution. The Department of Energy has reported converting wood to mineral by soaking wood in an acid bath, then soaking the wood in a silica solution, air-drying the wood, heating the wood, and letting the wood cool. The carbon left in the cellulose reacts with the silica to form a silicon carbide, which is extremely hard. Many other methods have been examined and reported for petrifying wood and other cellulosic materials, for example the methods reported in U.S. Patent Application Publication No. 2004/0105938. According to several exemplary embodiments, any suitable method for petrifying cellulosic materials may be used.

The petrification of cellulosic materials can be considered to take place in five stages. First, silica enters the cellulosic material either in solution or as a colloid. Second, the silica penetrates into the cell walls of the cellulosic material structure. Third, the cell walls progressively dissolve and the cell walls are replaced by silica so that the cellulosic material's dimensional stability is maintained (i.e., the cellulosic material retains its shape). Fourth, silica is deposited within the voids of the cellular wall framework structure. Fifth, the silica is hardened by drying out.

The cellulosic material may be pre-treated with acid to prepare the cellulose to receive the silica. The pre-treatment with acid can result in a faster petrification process and/or a stronger resulting petrified cellulosic material, but is not required.

Figure 2:
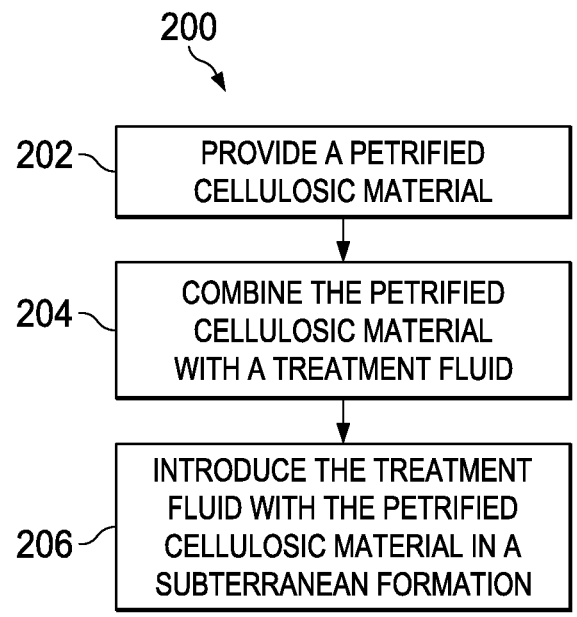
FIG. 2 depicts a method of treating a subterranean formation according to embodiments of the present invention.

According to several exemplary embodiments, a method of treating a subterranean formation is provided. Turning now to FIG. 2, the method 200 includes providing a petrified cellulosic material in step 202, combining the petrified cellulosic material with a treatment fluid in step 204, and introducing the treatment fluid with the petrified cellulosic material in the subterranean formation in step 206.

According to several exemplary embodiments, the petrified cellulosic material is added to a fracturing fluid as a proppant. Proppants are specific to fracturing fluids where an intentionally initiated fracture is propped and maintained open with the proppant to facilitate liquid extraction from the formation. Generally, proppants are employed in hydraulic fracturing procedures and are used in concentrations of roughly about 1 to about 10 pounds per gallon of the fracturing fluid. The proppant prevents fractures from fully closing upon the release of hydraulic pressure by forming conductive channels through which fluids may flow to the wellbore.

The shape of the proppant has a significant impact on how it packs with other proppant particles and the surrounding area. Thus, the shape of the proppant can significantly alter the permeability and conductivity of a proppant pack in a fracture. Different shapes of the same material offer different strengths and resistance to closure stress. It is desirable to engineer the shape of the proppant to provide high strength and a packing tendency that will increase the flow of oil or natural gas. The optimum shape may differ for different depths, closure stresses, geologies of the surrounding earth, and materials to be extracted. In hydraulic fracturing applications, it is especially advantageous for the proppant to have a shape that facilitates the ability of the proppant to flow into a formation, bridge together, and resist flow back. According to several exemplary embodiments, the proppants are in the shape of short open tubes or rings that can stack in such a manner as to provide higher porosity and less restriction to the flow of fluids out of the formation.

According to several exemplary embodiments, the petrified cellulosic material is added to a drilling fluid as a weighting agent, fluid loss control agent, and/or wellbore strengthening pill material. For drilling fluids, the typical materials used are very hard and potentially abrasive. Advantageously, the petrified cellulosic material does not have these issues when used as a weighting agent, fluid loss control agent, and/or wellbore strengthening pill material.

Weighting agents are particulates used to modulate the density of a drilling fluid. In particular, weighting agents may be used to increase the density of drilling fluids. The weighting agent is added to the drilling fluid in an amount sufficient to provide a desired density. According to several exemplary embodiments, the weighting agents may be present in the drilling fluid in an amount of about 10 volume percent to about 60 volume percent. According to several exemplary embodiments, the weighting agents may exhibit an increase in density as compared to conventional weighting agents.

In oil and gas drilling and servicing, fluid loss control agents are often used to minimize the loss of drilling or service fluids (e.g., drilling muds and fracturing fluids) into the formation and to prevent damage to the formation by the leaked fluids. The shape of the fluid loss control agent can be used to control leak-off of fluids and obtain effective fluid loss control. According to several exemplary embodiments, the fluid loss control agents are fiber-shaped to provide bridging capabilities in formations having natural fractures or other features where bridging is desirable. According to several exemplary embodiments, the shape of the fluid loss control agents tend to seal pores and permeable avenues adjacent to a fracture and allow deeper penetration of a fracturing fluid by retaining the fluid in the fracturing fluid.

Particulates may be added to a drilling fluid to strengthen the wellbore. Wellbore strengthening involves inducing fractures while simultaneously plugging the fractures. Suitable particulates may include any known lost circulation material, bridging agent, fluid loss control agent, diverting agent, plugging agent, and the like, and any combination thereof. Lost circulation material can plug off fractures, which will result in higher formation strength and stop mud loss. According to several exemplary embodiments, the particulates added to the drilling fluid to strengthen the wellbore includes the petrified cellulosic material.

The drilling fluid may be a water-based fluid or an oil-based fluid. Water-based drilling fluids may have an aqueous fluid as the base liquid. The aqueous fluid may include at least one of fresh water, sea water, brine, mixtures of water and water-soluble organic compounds and mixtures thereof. For example, the aqueous fluid may be formulated with mixtures of desired salts in fresh water. Such salts may include, but are not limited to alkali metal chlorides, hydroxides, or carboxylates, for example. According to several exemplary embodiments, the brine may include seawater, aqueous solutions wherein the salt concentration is less than that of sea water, or aqueous solutions wherein the salt concentration is greater than that of sea water. Salts that may be found in seawater include, but are not limited to, sodium, calcium, sulfur, aluminum, magnesium, potassium, strontium, silicon, lithium, and phosphorus salts of chlorides, bromides, carbonates, iodides, chlorates, bromates, formates, nitrates, oxides, and fluorides. Salts that may be incorporated in a brine include any one or more of those present in natural seawater or any other organic or inorganic dissolved salts. Additionally, brines that may be used in the drilling fluids may be natural or synthetic, with synthetic brines tending to be much simpler in constitution. According to several exemplary embodiments, the density of the drilling fluid may be controlled by increasing the salt concentration in the brine (up to saturation). According to several exemplary embodiments, a brine may include halide or carboxylate salts of mono- or divalent cations of metals, such as cesium, potassium, calcium, zinc, and/or sodium.

Oil-based drilling fluids may include an invert emulsion having an oleaginous continuous phase and a non-oleaginous discontinuous phase. The oleaginous fluid may be a liquid and may be a natural or synthetic oil, such as diesel oil, mineral oil, a synthetic oil, (e.g., hydrogenated and unhydrogenated olefins including polyalpha olefins, linear and branch olefins and the like, polydiorganosiloxanes, siloxanes, or organosiloxanes, esters of fatty acids, specifically straight chain, branched and cyclical alkyl ethers of fatty acids, mixtures thereof and similar compounds known to one of ordinary skill in the art), and mixtures thereof. The concentration of the oleaginous fluid should be sufficient so that an invert emulsion forms and may be less than about 99% by volume of the invert emulsion. According to several exemplary embodiments, the amount of oleaginous fluid is from about 30% to about 95% by volume (e.g., about 40% to about 90% by volume of the invert emulsion fluid).

The non-oleaginous fluid used in the formulation of the invert emulsion fluid is a liquid and may be an aqueous liquid. According to several exemplary embodiments, the non-oleaginous liquid may be selected from the group including sea water, a brine containing organic and/or inorganic dissolved salts, liquids containing water-miscible organic compounds and combinations thereof.

According to several exemplary embodiments, the petrified cellulosic material is added to a completion fluid as a gravel pack material and/or lost circulation pill material. Completion fluids improve well productivity by reducing damage to the producing zone, and can help prepare, repair, cleanout, and complete the wellbore during the completion phase.

Gravel packing treatments are used to reduce the migration of unconsolidated formation sands into the wellbore. In gravel packing operations, the particles suspended in a treatment fluid are pumped into a wellbore in which the gravel pack is to be placed. The treatment fluid leaks off into the subterranean zone and/or is returned to the surface while the particles are left in the subterranean zone. The resultant gravel pack acts as a filter to separate formation sands from produced fluids while permitting the produced oil and/or gas to flow into the well bore. The shape of the gravel can have a large effect on the conductivity of a pack of gravel. According to several exemplary embodiments, the gravel provides greater conductivity than conventional gravel.

According to several exemplary embodiments, the petrified cellulosic material is added to a cementing fluid as a cement strengthening and modulus modifying material and/or a cement weighting material. As a cement weighting material, the petrified cellulosic material increases the density of the cementing fluid. Cementing fluids include any cement composition including a cementitious particulate. Cementing fluids may include any hydraulic or non-hydraulic cement composition, such as a Portland or Sorel cement, respectively. Suitable examples of hydraulic cements that may be used include, but are not limited to, those that include calcium, aluminum, silicon, oxygen, and/or sulfur, which set and harden by reaction with water. Examples include, but are not limited to, Portland cements, pozzolanic cements, gypsum cements, calcium phosphate cements, high alumina content cements, silica cements, high alkalinity cements, and mixtures thereof. Cementing fluids may include any composition used in the formation of a set cement sheath in a wellbore. Cementing fluids may include cement kiln dust (CKD), fly ash, and other additives as recognized by one of ordinary skill in the art.

According to several exemplary embodiments, the cementing fluid is harder and stronger than conventional cementing fluids. According to several exemplary embodiments in which the additive is in the form of a fibrous silicon carbide tube, the cement can have a hardness similar to that of reinforced concrete. According to several exemplary embodiments, in which the additive is in the form of an open tube, the cement can still be hard, but lighter.

According to several exemplary embodiments, mixtures of different sizes of the additives with the same shape, as well as mixtures of different shapes and different sizes may be used in the treatment fluid. Mixtures of different shapes may increase flow back properties as well as provide additional conductivity.

Figure 3:
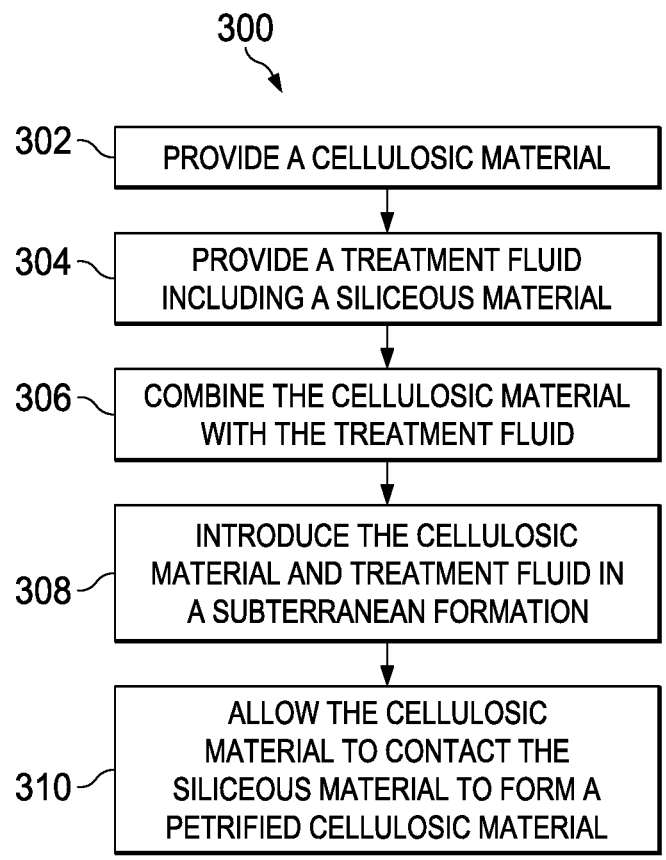
FIG. 3 depicts another method of treating a subterranean formation according to embodiments of the present invention.

According to several exemplary embodiments, another method of treating a subterranean formation is provided. Turning now to FIG. 3, the method 300 includes providing a cellulosic material in step 302, providing a treatment fluid comprising a siliceous material in step 304, combining the cellulosic material with the treatment fluid in step 306, introducing the cellulosic material and treatment fluid in the subterranean formation in step 308, and allowing the cellulosic material to contact the siliceous material to form a petrified cellulosic material in step 310. According to several exemplary embodiments, the siliceous material includes a soluble silicate such as sodium silicate and/or potassium silicate.

According to several exemplary embodiments, the cellulosic materials can be petrified after they are placed in or added to the treatment fluid. In other words, they are petrified "in place." For example, the cellulosic material can be placed in a silicate based drilling mud and as the mud is circulated, the silicate impregnates the cellulosic material to transform the cellulosic material to a petrified cellulosic material. How long the silicate is kept in contact with the cellulosic materials depends on the desired strength and/or density. If the cellulosic material does not need to be incredibly hard, the silicate may be kept in contact with the cellulosic material for a few hours or days. The silicate may be kept in contact with the cellulosic material longer if a harder material is desired.

Advantageously, the present disclosure describes methods and compositions that provide stronger and harder additives for treatment fluids. The methods allow for controlled morphology of the additives, are simple, and are relatively inexpensive.

Although only a few exemplary embodiments have been described in detail above, those of ordinary skill in the art will readily appreciate that many other modifications are possible in the exemplary embodiments without materially departing from the novel teachings and advantages of the present invention. Accordingly, all such modifications are intended to be included within the scope of the present invention as defined in the following claims.

What is claimed is:

1. A method of treating a subterranean formation comprising:
   providing a cellulosic material in the form of a sheet, a fiber, a tube, a rod, a disc, a ring, a polyhedral, an ellipsoid, or a cone;
   petrifying the cellulosic material with a soluble silicate to form a petrified cellulosic material;
   combining the petrified cellulosic material with a treatment fluid; and
   introducing the treatment fluid with the petrified cellulosic material in the subterranean formation.

2. The method of claim 1, wherein the cellulosic material comprises wood, paper, bamboo, cotton, grass, or straw materials.

3. The method of claim 1, wherein the soluble silicate comprises sodium silicate or potassium silicate.

4. The method of claim 1, wherein introducing the treatment fluid comprises introducing the treatment fluid during a drilling operation, a cementing operation, or a fracturing operation.

5. The method of claim 4, wherein the petrified cellulosic material acts as one or more of a proppant, a weighting agent, a fluid loss control agent, and a gravel pack material.

6. The method of claim 1, wherein the treatment fluid further comprises a cementitious particulate.

7. A method of treating a subterranean formation comprising:
   selecting a desired shape for a proppant, a fluid loss control agent, or a cement additive;
   selecting a cellulosic material having the desired shape;
   petrifying the cellulosic material with a soluble silicate to form a petrified cellulosic material;
   combining the petrified cellulosic material with a treatment fluid; and
   introducing the treatment fluid during a drilling operation, a fracturing operation, or a cementing operation.

8. The method of claim 7, wherein the cellulosic material comprises wood, paper, bamboo, cotton, grass, or straw materials.

9. The method of claim 7, wherein the desired shape comprises a ring, a fiber, or a tube.

10. The method of claim 7, wherein the soluble silicate comprises a sodium silicate or a potassium silicate.

11. The method of claim 7, wherein the treatment fluid further comprises a cementitious particulate.

* * * * *